(12) United States Patent
Bonn et al.

(10) Patent No.: US 6,803,533 B2
(45) Date of Patent: Oct. 12, 2004

(54) STEERING WHEEL HAVING A SWITCHING DEVICE FOR ACTUATING AN ELECTRICAL FUNCTIONAL GROUP OF A MOTOR VEHICLE

(75) Inventors: Helmut Bonn, Haibach (DE); Harald Burdack, Haibach (DE)

(73) Assignee: Takata-Petri AG, Aschaffenburg (DE)

( * ) Notice: Subject to any disclaimer, the term of this patent is extended or adjusted under 35 U.S.C. 154(b) by 151 days.

(21) Appl. No.: 10/237,991

(22) Filed: Sep. 10, 2002

(65) Prior Publication Data

US 2004/0045797 A1 Mar. 11, 2004

Related U.S. Application Data

(63) Continuation of application No. PCT/DE01/01024, filed on Mar. 12, 2001.

(30) Foreign Application Priority Data

Mar. 10, 2000 (DE) ..................... 200 04 953 U (51) Int. Cl.[7] ............. H01H 9/00; H01H 1/06; H01H 1/18
(52) U.S. Cl. ............... 200/61.55; 200/241; 200/275
(58) Field of Search ................ 200/61.54–61.57, 200/237–292, 402, 457, 339

(56) References Cited

U.S. PATENT DOCUMENTS

| | | | |
|---|---|---|---|
| 3,912,895 A | 10/1975 | Plana | 200/164 |
| 4,851,623 A | 7/1989 | Honda et al. | 200/314 |
| 5,107,084 A | 4/1992 | Ueno et al. | 200/457 |
| 5,338,906 A | 8/1994 | Yokota | 200/61.54 |
| 5,780,797 A * | 7/1998 | Budnik | 200/61.55 |
| 5,960,939 A | 10/1999 | Miki et al. | 200/257 |
| 6,491,319 B2 * | 12/2002 | Bonn | 200/61.55 X |

FOREIGN PATENT DOCUMENTS

| | | |
|---|---|---|
| DE | 667 8508 | 11/1938 |
| DE | 3437 110 A1 | 4/1986 |
| DE | 3639 166 | 6/1989 |
| DE | 38 14 903 A1 | 11/1989 |
| DE | 35 86 237 T2 | 2/1993 |
| DE | 44 30 276 A1 | 2/1996 |
| DE | 690 23 122 T2 | 6/1996 |
| DE | 197 46 298 A1 | 4/1998 |
| DE | 198 34 375 C1 | 12/1999 |
| JP | 09231868 | 9/1997 |
| JP | 11067003 | 3/1999 |

* cited by examiner

Primary Examiner—James R. Scott
(74) Attorney, Agent, or Firm—Foley & Lardner LLP (57) ABSTRACT

A steering wheel for motor vehicle that includes at least one switching device for actuating an electric functional group such as, for example, a vehicle horn. The switching device includes two electric contact elements that can be moved in relation to one another and can be brought into contact with one another for actuating the functional group. According to the invention, one of the contact elements is mounted in a springy manner and so that one of the contact elements glides along the other element after the two contact elements have been brought into contact with one another for actuating the electric functional group.

26 Claims, 7 Drawing Sheets

STEERING WHEEL HAVING A SWITCHING DEVICE FOR ACTUATING AN ELECTRICAL FUNCTIONAL GROUP OF A MOTOR VEHICLE

CROSS-REFERENCE TO RELATED APPLICATIONS

This is a continuation of International Application PCT/DE01/01024, which has an international filing date of Mar. 12, 2001; the International Application was not published in English, but was published in German as WO 01/66383.

BACKGROUND

The invention relates to a steering wheel for motor vehicles. In particular, a steering wheel that includes a switching device for actuating an electric functional group of a motor vehicle.

It is customary, in order to trigger electric functional groups of a motor vehicle, in particular to trigger a signal horn, to use one or more switching devices which can be actuated by a force being exerted on a central region of the steering wheel and which in each case comprise two electric contact elements (for example, in the form of contact elements made of silver) which are moveable relative to one another and which can be brought into contact with one another in order to trigger the corresponding electric functional group.

In a switching device of this type, there is the problem that the contact elements in time become contaminated or covered with an oxide layer, this being detrimental to the functioning capacity of the switching device. This applies particularly when, the switching device is used to activate a relay or to transmit a control signal to an electronic device in order to trigger the signal horn device. In these cases, only weak currents with a current intensity of the order of magnitude of 20 mA, along with a voltage of the order of magnitude of 5 V to 12 V, flow across the two contact elements of the switching device.

The contamination or oxidation of the contact elements then has a particularly adverse effect.

SUMMARY

An object of the present invention is to provide a steering wheel for a motor vehicle, the steering wheel comprising a switching device for actuating an electric functional group of a motor vehicle and being distinguished by increased functional reliability.

According to an embodiment of the present invention, a steering wheel is provided that includes a switching device having a pair of contact elements. At least one of the contact elements is mounted resiliently so that it slides along the other contact element after the two contact elements have been brought into contact with one another under the force applied in order to make electric contact and close the switching device.

Since, by virtue of the resilient mounting of one contact element, after electric contact has been made the two contact elements execute a relative movement in relation to one another with their contact faces which are in contact, the contact elements are cleaned of contamination and/or freed of an oxide layer. During the closing of the switching device, therefore, a cleaning of the contacts takes place automatically as one contact face slidingly contacts the other contact face.

According to another embodiment of the present invention, the steering wheel is arranged so that when a force is exerted on the actuating portion on the steering wheel, for example in the central steering wheel region, the two contact elements move toward one another along a first direction until they come into contact with one another, and, after contact has been made, the resiliently mounted contact element to yield along a second direction and at the same time slide over the other contact element, the second direction preferably running essentially perpendicularly to the first direction. The contact faces of the two contact element extend essentially perpendicularly to the first direction along which the two contacts can be moved toward one another.

According to an embodiment of the present invention, the two contact elements of the switching device are fastened to two carrying subassemblies of the steering wheel which are moveable relative to one another in order to make contact. In one embodiment, one of the contact elements is secured to a subassembly of the steering wheel skeleton and the other contact element is mounted on a subassembly moveable with respect to the steering wheel skeleton.

According to an embodiment of the present invention, the subassembly is moveable with respect to the steering wheel, preferably comprises a contact carrier and is connected resiliently to the steering skeleton by an elastic element.

The contact carrier provided with one contact element is moved toward the subassembly provided with the other contact element and located on the steering wheel skeleton side, by a force being exerted on the central steering wheel region, in which an airbag module is mounted moveably, so that the two contact elements come into contact with one another.

The resiliently mounted contact element may be connected via an elastic element to the associated carrying subassembly, for example the contact carrier. The elastic element both may be integrally formed in one piece on the contact element and may be produced as a separate elastic element fastened to the contact element.

According to an embodiment of the present invention, the elastic element is placed under prestress in order to ensure a defined position of the contact element and consequently also a defined distance from the other contact element.

In another embodiment of the present invention, the elastic element has a limb running at an acute angle to the direction of movement along which the two contact elements can be brought into contact with one another. The acute angle is selected so that the angle between the limb of the elastic element and the contact face of the contact element is at least 45 degrees. The size of the angle between the limb of the elastic element and the contact face of the associated contact element establishes how far the resiliently mounted contact element moves along the other contact element after the two contact elements have come into contact, when this movement is caused by a defined force.

The associated contact element is fastened to one end of the limb of the elastic element and the other end of the limb is secured to the corresponding carrying subassembly, for example the contact carrier. At the same time, the limb is preferably supported on a supporting element of the carrying subassembly, and this subassembly, on the one hand may be integrally formed in one piece on the limb or, alternatively, forms an inclined plane on which the limb of the elastic element comes to bear.

In order to make it easier to convert a force under which the two contact elements first move toward one another until they are in contact with one another, into a movement during which the contact face of one contact element slides over the contact face of the other contact element, the limb of the elastic element is mounted, preferably with its end facing away from the contact element, at a bearing point of punctiform cross section, so that the limb can pivot.

Furthermore, stops may be provided, which cooperate in order to limit the movement of the two contact elements relative to one another and consequently also to limit the maximum force which the two contact elements exert on one another. The distance between the two contact elements in the direction of movement is smaller than the distance between the two stops along this direction, because the two stops must allow the two contact elements to come into contact with one another and subsequently move parallel to one another, before further movement is prevented by the two stops meeting one another.

According to yet another embodiment of the present invention, the contact carrier comprises a conducting material and is connected to a junction plug, so that the contact carrier can be brought to a defined electric potential. In this case, the contact carrier may also be produced in one piece with the junction plug. The contact carrier and the junction plug, integrally formed in one piece on the latter in order to minimize the contact resistance, may comprise, for example, tinned sheet steel or sheet brass.

In order to prevent the contamination of the contact elements as far as possible from the outset, these may be surrounded by a sheath.

The non-resiliently mounted contact is preferably a contact rivet which has a rough contact face, for example a grooved surface. The rough surface improves the cleaning action which occurs while one contact face is moving along the other. As a result of the rough surface, the contact pressure which has to be exerted by the resiliently mounted contact element on the other contact element in order to achieve a sufficient cleaning action is reduced. Also, the size of the elastic element (e.g., contact spring) used in the resilient mounting of one contact element can thereby be reduced.

According to a further embodiment of the present invention, the resiliently mounted contact element may preferably be formed by a contact plate which has stiffening ribs and/or relief slots or bores, in order to increase or reduce in a specific way the contact pressure which occurs when the two contact elements come into contact with one another under the action of a defined force.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

FIG. 4b is a perspective illustration of a contact element of the switching device from FIG. 4a.

FIG. 5b is a top view of the contact face of the contact rivet from FIG. 5a.

DESCRIPTION

Figure 1:
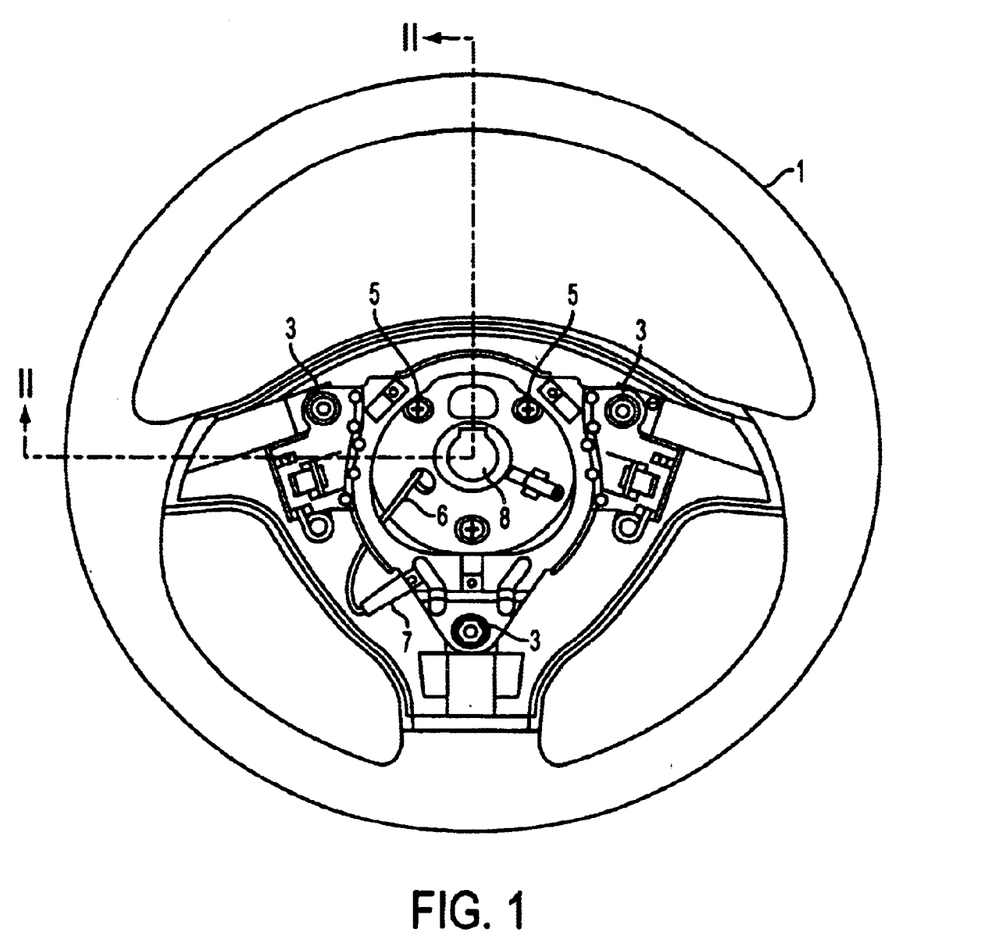
FIG. 1 is a top view of a steering wheel, the central steering wheel region of which serves for receiving an airbag module is not illustrated in FIG. 1 so that the electric subassemblies in the central steering wheel region can be seen.
Figure 2:
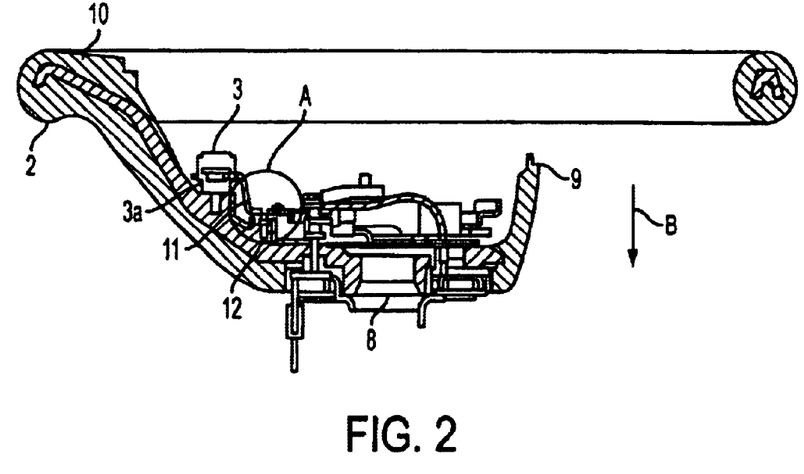
FIG. 2 is a cross sectional view along the line II—II of the steering wheel from FIG. 1.

FIGS. 1 and 2 show a steering wheel 1 which has three spokes and in the central region of which a plurality of mechanical and electric subassemblies can be seen, since the airbag module covering this region is not also illustrated.

The steering wheel 1 has a rotatable steering wheel skeleton 2 mounted on a steering wheel hub 8 and having a casing 10, to which a contact carrier 11 is fastened via three fastening mechanisms in the form of collar screws 3. At the same time, each of the collar screws 3 has mounted on it an elastic element in the form of a prestressed helical spring 3a, via which the contact carrier 11 is supported resiliently, under prestress, on the steering wheel skeleton 2.

Arranged next to each of the collar screws 3 is a switching device 4, 12 which serves for actuating a signal horn of the motor vehicle and which is described in more detail below with reference to FIGS. 3a–3c. A contact unit is provided so that the switching device 4, 12 can be connected electrically to the signal horn. The contact unit serves for the transmission of electric signals between two subassemblies of a motor vehicle which are moveable relative to one another. One subassembly may move with the steering wheel, while the other subassembly is fixed with respect to the steering wheel. Conventional contact units are described in DE 195 06 865 C1 and DE 195 25 928 02 (both of which are incorporated by reference herein). The fastening screws 5 for the contact unit are illustrated in FIG. 1.

Furthermore, an electric cable 6 with a junction plug 7 can be seen in FIGS. 1 and 2, the cable serving for supplying current to an airbag unit which is resiliently fastened in a known way to bearing points 9 on the steering wheel, so that the airbag unit is moveable parallel to the steering wheel hub 8 when a pressure is exerted on the central steering wheel region (which is formed by a cover cap of the airbag module). As can be seen in FIG. 2, the contact carrier 11 moves (in the axial direction), parallel to the direction B of the steering wheel hub 8, toward the steering wheel skeleton 2, with the result that the contact elements of the switching device 4, 12 are closed. This process will be explained in more detail below with reference to FIGS. 3a-3c.

Figure 3A:
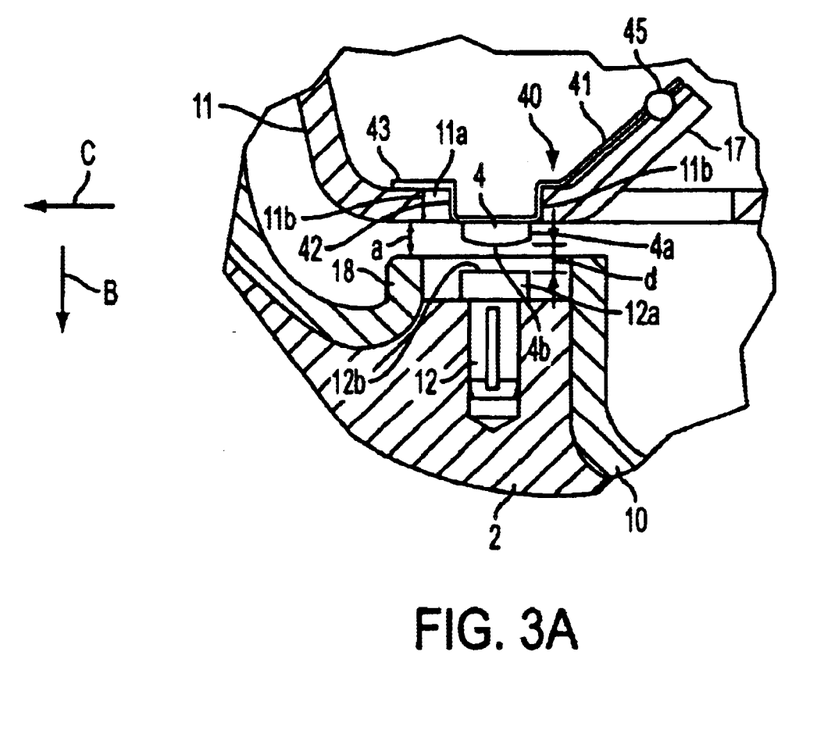
FIG. 3a is an enlarged illustration of a detail surrounded by circle A in FIG. 2, showing an electric switching device with two contact elements moveable relative to one another.

FIG. 3a illustrates, enlarged, the area bounded by a circle A around the switching device 4, 12 in FIG. 2. The switching device 4,12 comprises two contact elements. One contact element 4 is mounted resiliently on the contact carrier 11 and the other contact element 12 is produced as a contact rivet and is fastened to the steering wheel skeleton 2. The resiliently mounted contact element 4 comprises a cylindrical contact portion 4a which is integrally formed on an elastic element mounted on the contact carrier 11 and taking the form of a contact spring 40 and which has a contact face 4b.

The contact spring 40 serving for the resilient mounting of the contact element 4 has a plate-shaped end portion 43 which lies on the contact carrier 11 and which projects with a hollow-cylindrical extension 42 through a recess 11a of the contact carrier 11, the hollow cylindrical portion 42 forming at its free end the contact portion 4a having the contact face 4h. The plate-shaped portion 43 of the contact spring 40 has projecting from it at an angle of about 45 degrees a spring limb 41. The limb 41 lies on a supporting element which is formed by a supporting tab 17 bent out of the contact carrier and which produces an inclined plane as a rest for the spring limb 41. The spring limb 41 is preferably secured to the supporting tab 17 along a line (i.e., with a punctiform cross section) at a fastening point 45.

The recess 11a in the contact carrier 11 preferably has a width (extent transverse to the direction of movement B along which the two contact elements 4, 12 can be brought into contact with one another) of sufficient length so that the hollow-cylindrical portion 42 of the spring element 40 and consequently also the contact element 4 can be displaced in this recess 11a transversely to the direction of movement B.

The second contact element 12 is preferably a rivet fastened directly to the steering wheel skeleton 2, for which purpose a corresponding recess is provided in the casing 10 of the steering wheel skeleton 2. The rivet head 12a of the contact 12 is provided with a contact face 12b that serves as the contact portion. The rivet head 12a is surrounded by a hollow-cylindrical portion 18 of the casing 10.

The hollow-cylindrical portion 18 of the casing 10 and the lateral edges 11b of the recess 11a of the contact element 11 are arranged opposite one another so that they limit the movement of the contact carrier 11 in relation to the steering wheel skeleton 2 along the direction of movement B provided for closing the switching device 4, 12. This arrangement limits the contact force which the resiliently mounted contact element 4 can exert on the contact element 12 produced as a rivet contact during the closing of the switching device 4, 12. The distance "a" between the two stops 11b, 18 is preferably selected so that it is larger than the distance "d" between the two contact faces 4b, 12b along the direction of movement B. This ensures that the two stops 11b, 18 come into operative connection with one another in order to prevent a further movement of the contact elements 4, 12 only after these two contact elements have come into contact.

The distance "d" between the two contact faces 4b, 12b is fixed accurately and reproducibly in that the spring element 40 provided for receiving the first contact element 4 is supported under prestress on the contact carrier 11 or the supporting tab 17 of the latter.

As mentioned above, the contact carrier 11 is of electrically conducting design and is connected via an electric junction to a positive potential which thus also corresponds to the potential of the first, resiliently mounted contact element 4. By contrast, the other contact element 12 fastened directly to the steering wheel skeleton 2 is at a negative potential. When contact is closed and the two contact elements 4, 12 are connected to one another, this gives rise to a current which, for example, activates a relay or an electronic module and thereby initiates the triggering of the signal horn of the motor vehicle or of another electrically actuable subassembly. Of course, the present invention includes reversing the potentials to which the contact elements 4, 12 are connected.

Figure 3B:
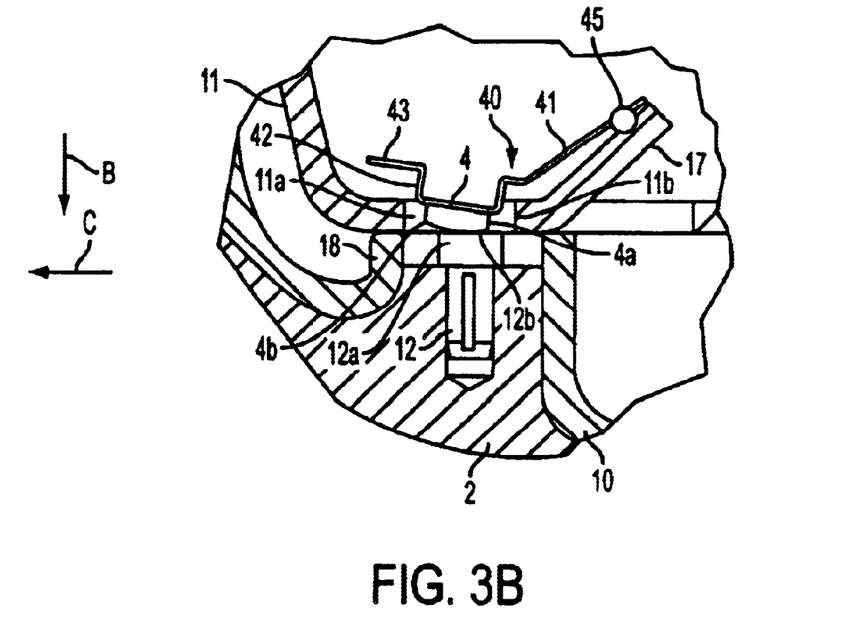
FIG. 3b is a view of the switching device from FIG. 3a with the contact elements in contact.

FIG. 3b shows the switching device from FIG. 3a after the closing of the contact, the two stops 11b, 18 having already come into abutment with one another. Since the distance "d" between the contact faces 4, 12b of the two contact elements 4, 12 in the direction of movement B is smaller than the distance a between the two stops 11b, 18, first the two contact faces 4b, 12b come into contact with one another when the contact carrier 11, together with the resiliently mounted contact element 4, is moved toward the contact element 12 fastened to the steering wheel skeleton 2.

By virtue of the resilient mounting of the contact element 4 fastened to the contact carrier 11 via a spring element 40, the relative movement of the two contact elements 4, 12 does not end abruptly even when the contact faces 4b, 12b come into contact. Rather, firstly a relative movement perpendicular to the direction of movement B takes place, during which the resiliently mounted contact 4 slides with its contact face 4b along the contact face 12b of the contact 12 fastened directly to the steering wheel skeleton. The contact faces 4b, 12b are thereby cleaned, in particular freed of dirt or an oxidation layer. This relative movement, during which the limb 4h fastened to the supporting tab 17 via a fastening point of punctiform cross section and acting as a lever executes a pivoting movement, ends only when the two stops 11b of the contact carrier 11, on the one hand, and 18 of the casing 10 of the steering wheel skeleton 2, on the other hand, have come into abutment with one another. The amount of relative movement of the two contact faces 4b, 12b perpendicular to the direction of movement B is in this case determined, inter alia, by the angle of the limb 41 with respect to the direction of movement B or with respect to the contact face 4b (i.e., with respect to the perpendicular to the direction of movement B). In the exemplary embodiment shown in FIGS. 3a and 3b, the two angles amount to 45 degrees. If the selected angle of the limb 4b to the direction of movement B is smaller than 45 degrees (and consequently the angle of the limb 41 to the contact face 4b is larger than 45 degrees), the amount of movement of the resiliently mounted contact element 4 perpendicular to the direction B can be increased.

Figure 3C:
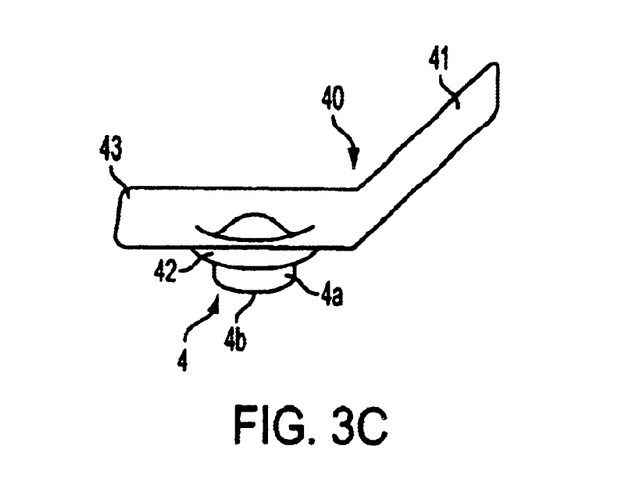
FIG. 3c is a perspective illustration of the contact element from FIGS. 3a and 3b.
Figure 3D:
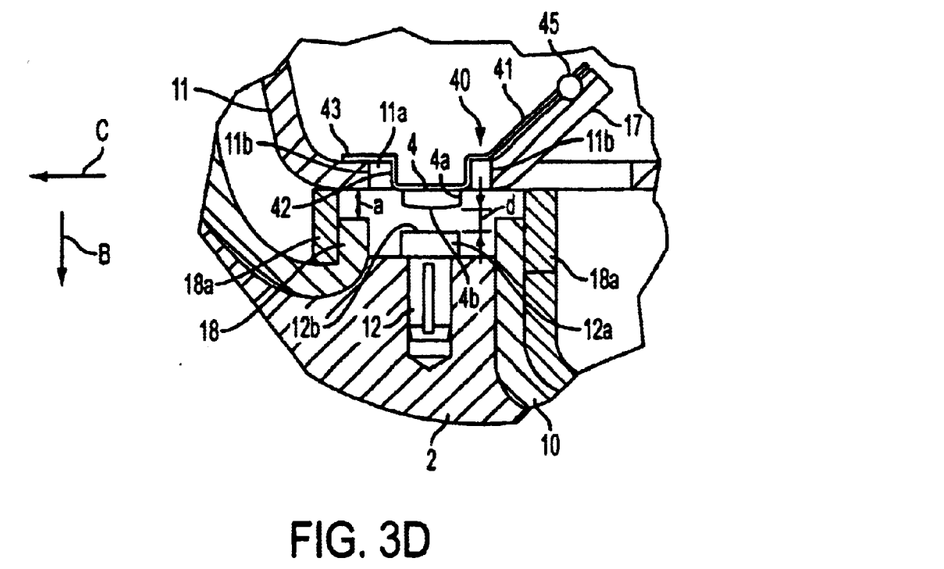
FIGS. 3d and 3e are views showing the movement of the switching device from FIGS. 3a and 3b.
Figure 3E:
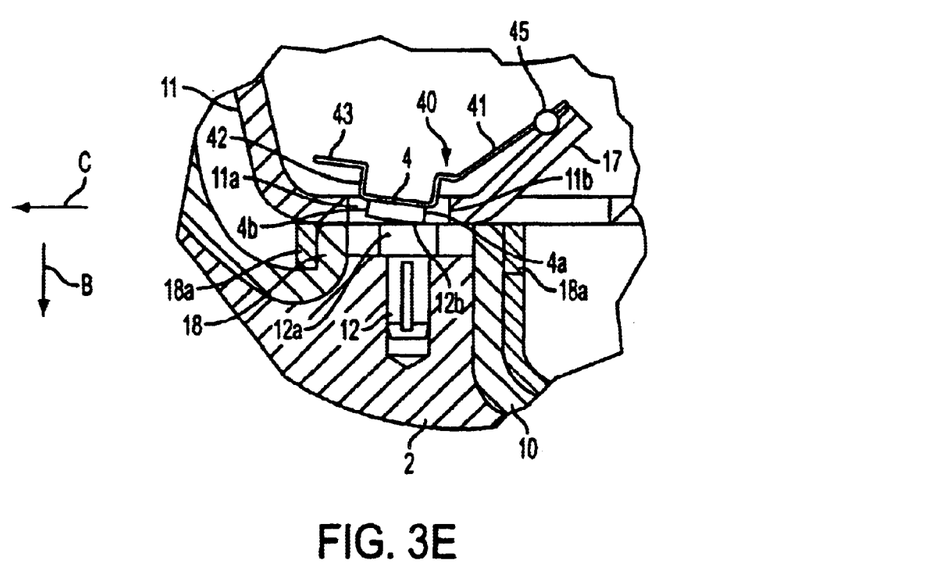

As shown in FIGS. 3d and 3e, the switching device 4, 12 may be surrounded by an elastically deformable hollow body in the form of a hollow-cylindrical open-cell foam body 18a (for example, made from Moltopren) in order to protect the device against dust and the like. The foam body 18a is supported, on the one hand, on the contact carrier 11, and, on the other hand, on the steering wheel skeleton 2 or the casing 10 of the latter and which is compressed during the closing of the switching device 4, 12. The open cells permit air exchange and movement.

Figure 4A:
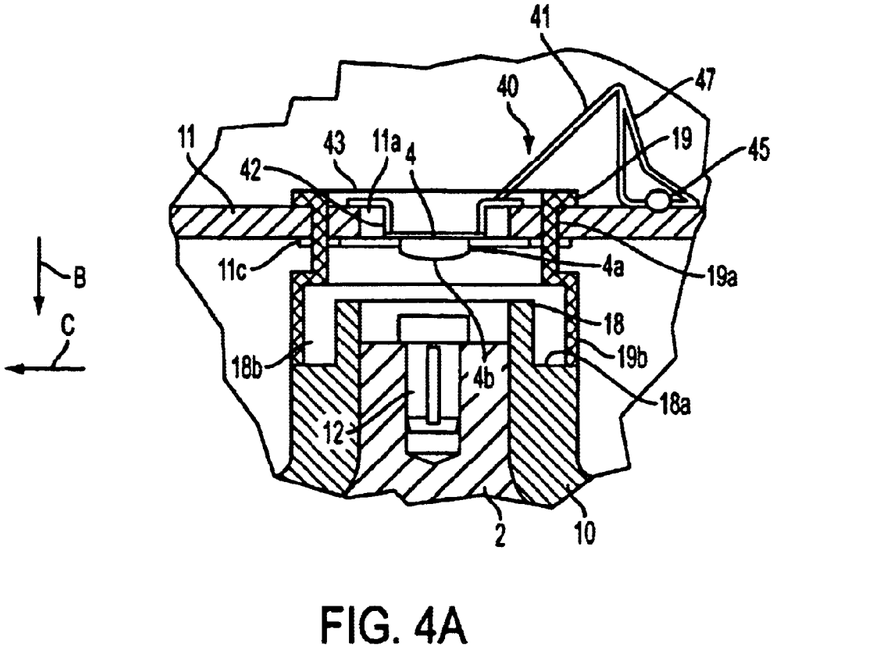
FIG. 4a is a view showing a modification of the switching device from FIGS. 3a and 3b.
Figure 4B:
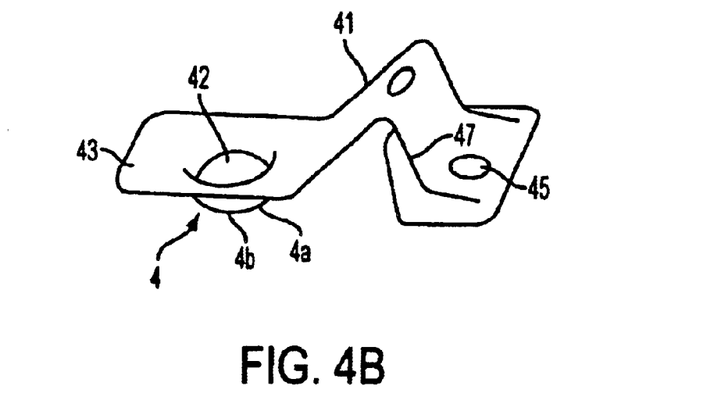

FIGS. 4a and 4b illustrate a modification of the exemplary embodiment from FIGS. 3a and 3b which differs in two respects from this exemplary embodiment.

First, the supporting element 47, via which a limb 41 of the contact spring 40 is supported on the contact carrier 11, is integrally formed in one piece on the contact spring 40 and is connected to the contact carrier via a fastening point 45 of punctiform cross section. The supporting element 47 is formed by a portion which is angled at one end from the limb 41 and which extends from the end of the limb 41 toward the contact carrier 11 and widens along this direction. A relief slot is provided in this case in the transitional region of the limb 41 and supporting element 47.

Second, in the exemplary embodiment according to FIGS. 4a and 4b, a dome-shaped sheath 19 in the form of an elastomer injection-molded on the contact carrier 11 is provided, which surrounds the switching device 4, 12 and thereby protects the latter against contamination. The dome-shaped sheath 19 comprises two essentially hollow-cylindrical portions 19a, 19b which are connected to one another in one piece and of which one hollow-cylindrical portion 19a is secured in associated bores 11c of the contact carrier 11 and the other portion 19b is supported on a shoulder 18a of the steering wheel casing 18. At the same time, a channel 18b, in which the first hollow-cylindrical portion 19a of the dome-shaped sheath 19 can slide, extends, essentially parallel to the direction of movement B, between the steering wheel casing h8 in the region of the shoulder 18a and the second portion 19b of the dome-shaped sheath 19. As a result, and by virtue of the elasticity of the material of the dome-shaped sheath 19, the two portions 19a, 19b of the dome-shaped sheath 19 are both moveable relative to one another and deformable and allow a movement of the two contact elements 4, 12 relative to one another along the direction B in order to make contact.

The exemplary embodiment illustrated in FIGS. 4a and 4b is otherwise identical to that shown in FIGS. 3a–3c, and therefore reference is made in this respect to the explanations given there.

Figure 5A:
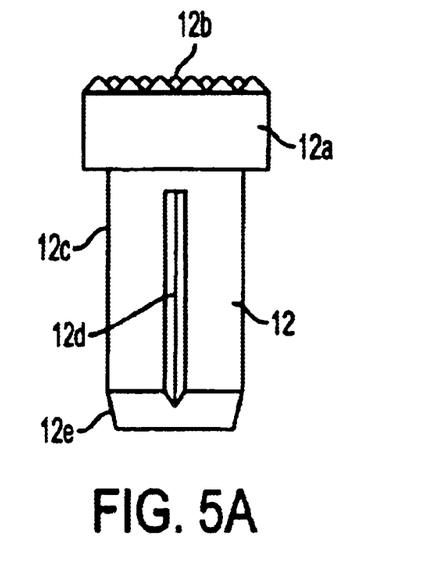
FIG. 5a is a side view of a contact rivet.
Figure 5B:
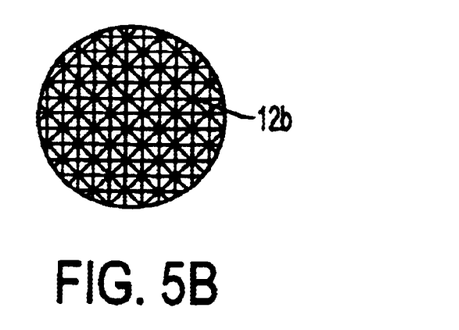

Finally, FIGS. 5a and 5b illustrate another exemplary embodiment of a contact element in the form of a contact rivet 12, the rivet head of which forms a contact portion 12a having a contact surface 12b. As shown in FIG. 5a, the contact surface 12b may be roughened in order to improve the cleaning action which occurs when the contact face of one contact element moves along the contact face of the other contact element. The roughened surface structure of the contact face 12b may in this case be produced, for example, by embossing or abrasion.

Furthermore, the contact rivet 12 has in its shank 12c a groove 12d extending in the longitudinal direction, and the shank 12c terminates at its lower end facing away from the rivet head 12a in a conically tapering region 12e.

By virtue of this arrangement of the stops 12b, 18, the contact carrier can also be moved further along the direction of movement B (axial direction) when the two contact elements 4, 12 are already in contact with their contact faces 4b, 12b.

In the embodiments of the invention described above, the resiliently mounted contact was in each case fastened to a moveable contact carrier prestressed resiliently with respect to the steering wheel skeleton and the other contact was fastened directly to the steering wheel skeleton itself. The opposite arrangement is, of course, also possible.

The priority document, DE 200 04 953.4, filed on Mar. 20, 2000, is incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A steering wheel for a motor vehicle comprising:
   a pair of carrying subassemblies;
   a switching device including a first and second electric contact elements for actuating an electric functional group of a motor vehicle; wherein each of the contact elements is mounted to a different one of the subassemblies;
   wherein the two subassemblies are moveable relative to one another in order to allow the contact elements to be brought into contact to actuate the functional group;
   wherein the first contact element is resiliently mounted to one of the subassemblies by an elastic element so that when the first contact element contacts the second contact element the first contact element slides along the second contact element.

2. The steering wheel of claim 1, wherein the two contact elements are adapted to move toward one another along a first direction until they come into contact with one another, and after contact is made the resiliently mounted first contact element yields along a second direction and at the same time slides over the second contact element 3. The steering wheel of claim 2, wherein the contact elements are adapted to move so that the second direction is essentially perpendicularly to the first direction.

4. The steering wheel of claim 2, wherein each of the two contact elements include contact surfaces which extend essentially perpendicularly to the first direction; wherein the contact surfaces are adapted to be brought into contact with one another.

5. The steering wheel of claim 1, wherein one of the two subassemblies is formed by the steering wheel skeleton, and the other subassembly is moveable mounted on the steering wheel skeleton.

6. The steering wheel of claim 5, wherein the subassembly moveably mounted on the steering wheel skeleton is prestressed elastically opposite to a first direction of movement along which the contact elements can be brought into contact with each other.

7. The steering wheel of claim 5, wherein the subassembly moveably mounted on the steering wheel skeleton is configured to be moved by exerting a force on a central steering wheel region in order to make contact between the two contact elements.

8. The steering wheel of claim 5, wherein the subassembly moveably mounted on the steering wheel skeleton comprises a contact carrier which is moveable in an axial direction with respect to the steering wheel skeleton.

9. The steering wheel of claim 1, wherein the first contact element is integrally formed in one piece with the elastic element.

10. The steering wheel of claim 9, wherein the elastic element has a limb which runs at an acute angle to a first direction along which the two contact elements can be brought into contact with one another.

11. The steering wheel of claim 10, wherein the contact element is provided at one end of the limb, and wherein the other end of the limb is secured to the carrying subassembly.

12. The steering wheel of claim 11, wherein the limb is supported on a supporting element of the carrying subassembly.

13. The steering wheel of claim 12, wherein the supporting element is integrally formed in one piece on the limb.

14. The steering wheel of claim 1, wherein the first contact element is pivotally mounted to the subassembly.

15. The steering wheel of claim 10, wherein the limb is pivotally mounted to the subassembly.

16. The steering wheel of claim 1, wherein the elastic element is under prestress.

17. The steering wheel of claim 1, further comprising a pair of stops which cooperate in order to limit the movement of the two contact elements relative to one another and thereby limit the force which the two contact elements exert on one another.

18. The steering wheel of claim 17, wherein the distance between the two contact elements along a first direction along which the two contact elements can be brought into contact with one another is smaller than the distance between the two stops along the first direction.

19. The steering wheel of claim 1, wherein the subassembly to which the resiliently mounted contact element is fastened is movable.

20. The steering wheel of claim 8, wherein the contact carrier comprises an electrically conducting material and is connected in one piece to an electric junction element.

21. The steering wheel of claim 1, further comprising a sheath surrounding the switching device to protect against contamination.

22. The steering wheel of claim 21, wherein the sheath comprises two portions moveable relative to one another along a first direction along which the two contact elements can be brought into contact with one another.

23. The steering wheel of claim 22, wherein the sheath comprises a hollow body deformable along the first direction.

24. The steering wheel of claim 4, wherein one of the contact surfaces has a roughened surface structure.

25. The steering wheel of one claim 1, wherein one of the contact elements is formed in the shape of a plate having stiffening ribs and/or recesses.

26. The steering wheel of claim 1, wherein the contact elements comprise a silver alloy or brass.

* * * * *